(12) United States Patent
Kim et al.

(10) Patent No.: US 12,500,260 B2
(45) Date of Patent: Dec. 16, 2025

(54) PRESSING JIG WITH A GRADIENT HARDNESS PRESSING PAD FOR A BATTERY CELL AND A DEGASSING METHOD OF BATTERY CELL USING THE SAME

(71) Applicant: LG ENERGY SOLUTION, LTD., Seoul (KR)

(72) Inventors: Sun Kyu Kim, Daejeon (KR); Sang Hoon Choy, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 685 days.

(21) Appl. No.: 17/793,336

(22) PCT Filed: Sep. 29, 2021

(86) PCT No.: PCT/KR2021/013319
§ 371 (c)(1),
(2) Date: Jul. 15, 2022

(87) PCT Pub. No.: WO2022/085976
PCT Pub. Date: Apr. 28, 2022

(65) Prior Publication Data
US 2023/0057926 A1    Feb. 23, 2023

(30) Foreign Application Priority Data
Oct. 23, 2020  (KR) .................. 10-2020-0138477

(51) Int. Cl.
*H01M 10/04*  (2006.01)
*H01M 10/44*  (2006.01)
(Continued)

(52) U.S. Cl.
CPC ... *H01M 10/0404* (2013.01); *H01M 10/0481* (2013.01); *H01M 10/049* (2013.01);
(Continued)

(58) Field of Classification Search
CPC .......... H01M 10/0404; H01M 50/105; H01M 10/0481; H01M 10/049; H01M 10/446; H01M 10/52; Y02P 70/50; Y02E 60/10
See application file for complete search history.

(56) References Cited

U.S. PATENT DOCUMENTS

| | | | |
|---|---|---|---|
| 2018/0226673 A1 | 8/2018 | Bae et al. | |
| 2020/0049678 A1* | 2/2020 | Shin | G01N 33/0062 |
| 2022/0278352 A1* | 9/2022 | Hong | H01M 50/317 |

FOREIGN PATENT DOCUMENTS

| | | |
|---|---|---|
| CN | 1667851 A | 9/2005 |
| CN | 110612634 A | 12/2019 |

(Continued)

OTHER PUBLICATIONS

A Review of Elastic Plastic Contact Mechanics by Hamid Ghaednia (Year: 2017).*

(Continued)

*Primary Examiner* — Wyatt P McConnell
*Assistant Examiner* — Lawrence La Raia, III
(74) *Attorney, Agent, or Firm* — Birch, Stewart, Kolasch & Birch, LLP

(57) ABSTRACT

A pressing jig of a battery cell including a pressing pad, in which the modulus of the central region is different from the modulus of the peripheral region, and a method of degassing a battery cell using the same are provided. The pressing pad can easily discharge gas in the battery cell during the formation process of a battery cell by allowing higher pressure to be applied to the central region than the peripheral region.

11 Claims, 5 Drawing Sheets

(51) Int. Cl.
    *H01M 10/52*     (2006.01)
    *H01M 50/105*     (2021.01)

(52) U.S. Cl.
    CPC ......... *H01M 10/446* (2013.01); *H01M 10/52* (2013.01); *H01M 50/105* (2021.01); *Y02E 60/10* (2013.01); *Y02P 70/50* (2015.11)

(56) References Cited

FOREIGN PATENT DOCUMENTS

| | | |
|---|---|---|
| JP | 2001-160413 A | 6/2001 |
| JP | 2001-297798 A | 10/2001 |
| KR | 10-2013-0044776 A | 5/2013 |
| KR | 10-1811474 B1 | 12/2017 |
| KR | 10-2018-0092406 A | 8/2018 |
| KR | 10-2018-0093321 A | 8/2018 |
| KR | 10-2019-0056984 A | 5/2019 |
| KR | 10-2004295 B1 | 7/2019 |
| KR | 10-2020-0054727 A | 5/2020 |
| KR | 10-2135266 B1 | 7/2020 |
| KR | 10-2020-0095107 A | 8/2020 |

OTHER PUBLICATIONS

Kim Machine translation to English (Year: 2025).*
Investigation of the relationship between elastic modulus and hardness based on depth-sensing indentation measurements by Bao et al (Year: 2004).*
Chinese Office Action and Search Report for Chinese Application No. 202180009324.X, dated Mar. 29, 2025, with English translation.
International Search Report for PCT/KR2021/013319 (PCT/ISA/210) mailed on Jan. 7, 2022.

* cited by examiner

[FIG. 1]
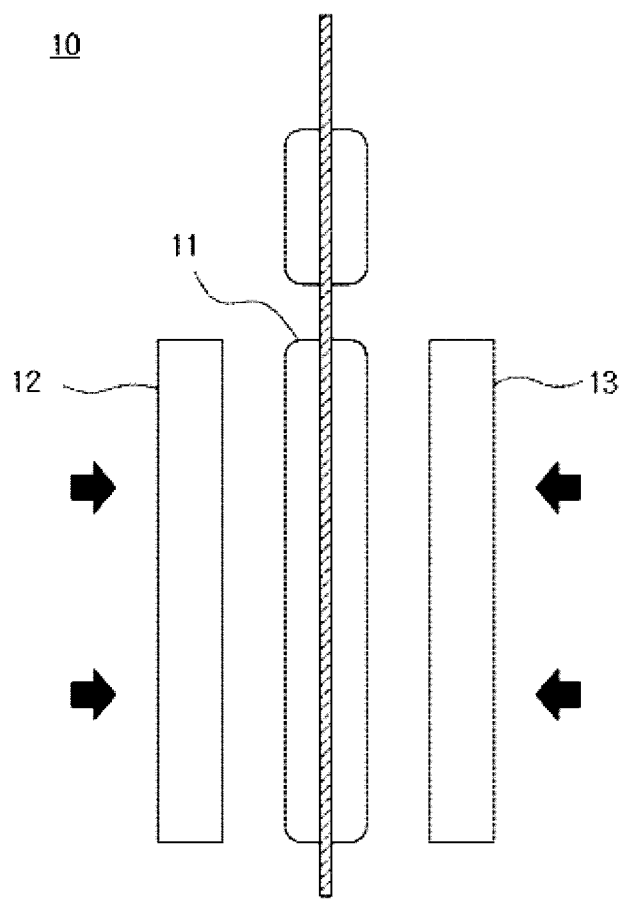

[FIG. 2]
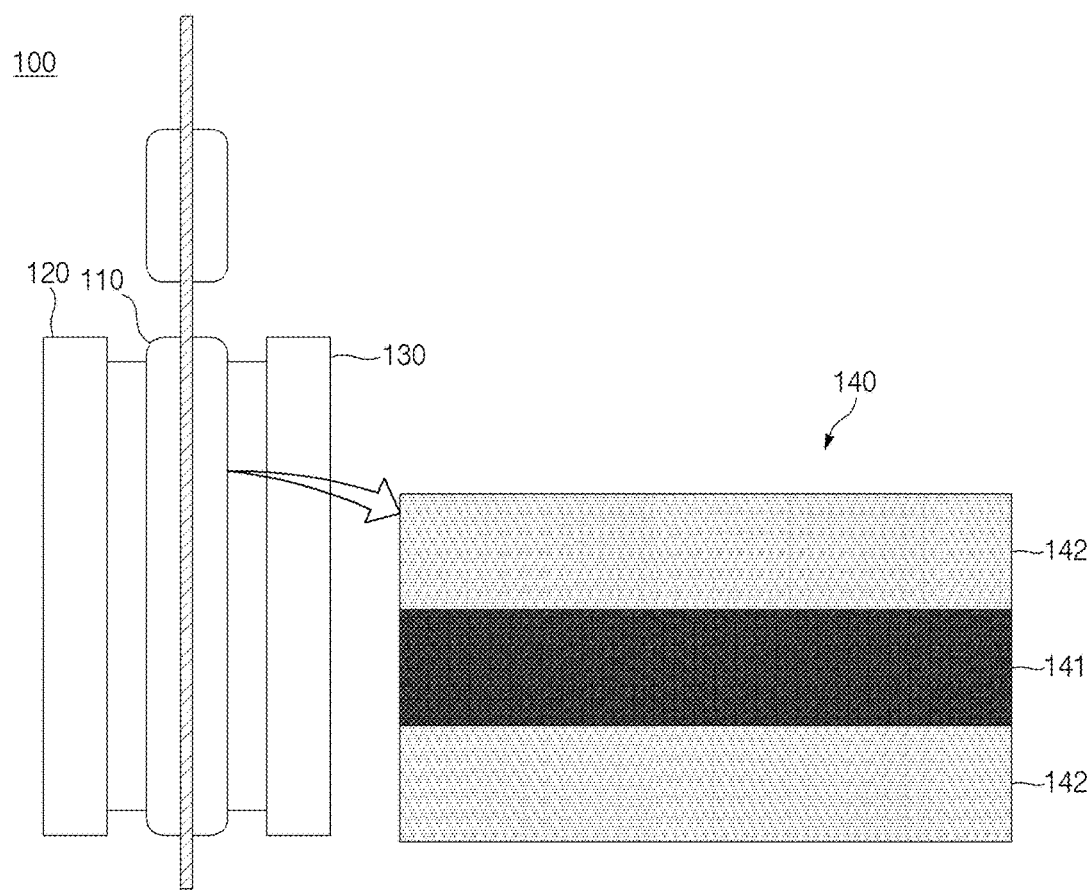

[FIG. 3]
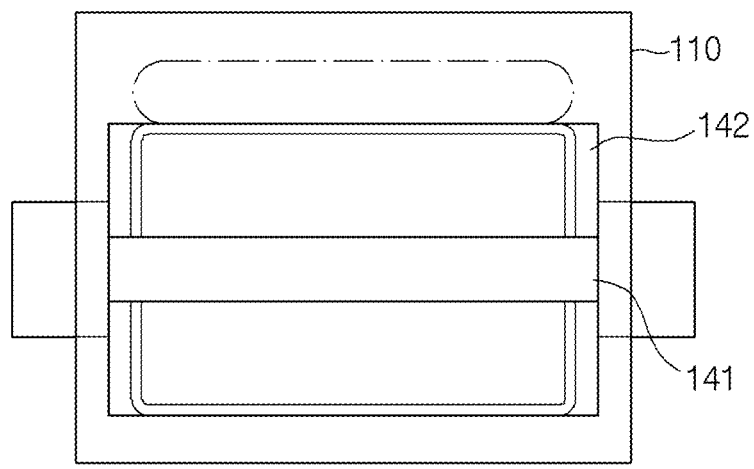

[FIG. 4]
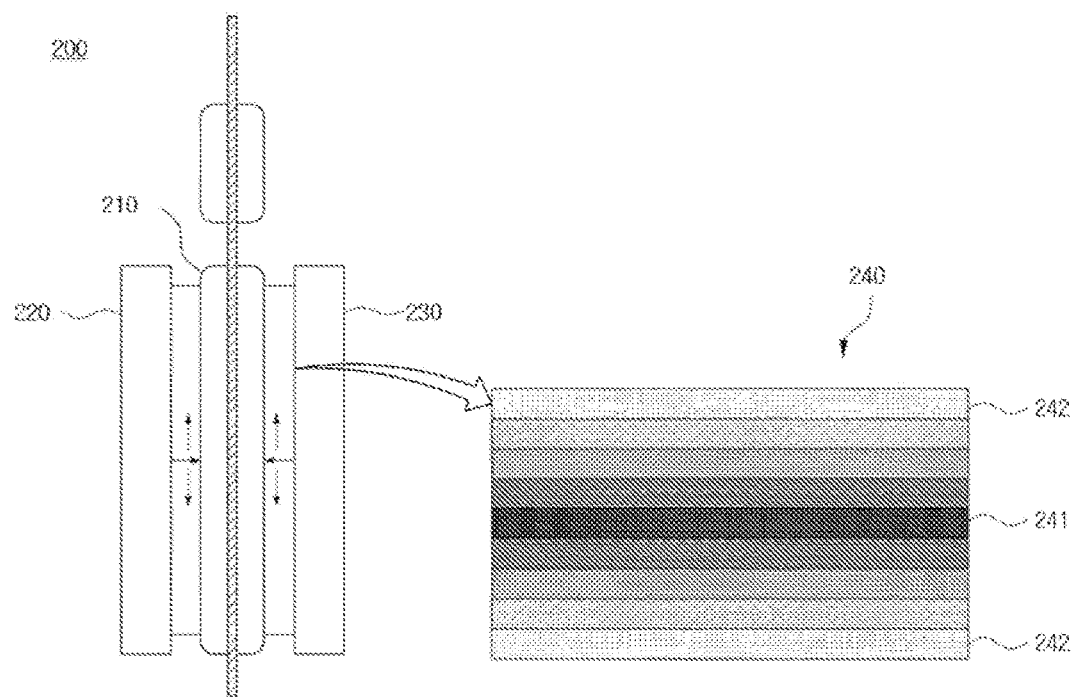

[FIG. 5]
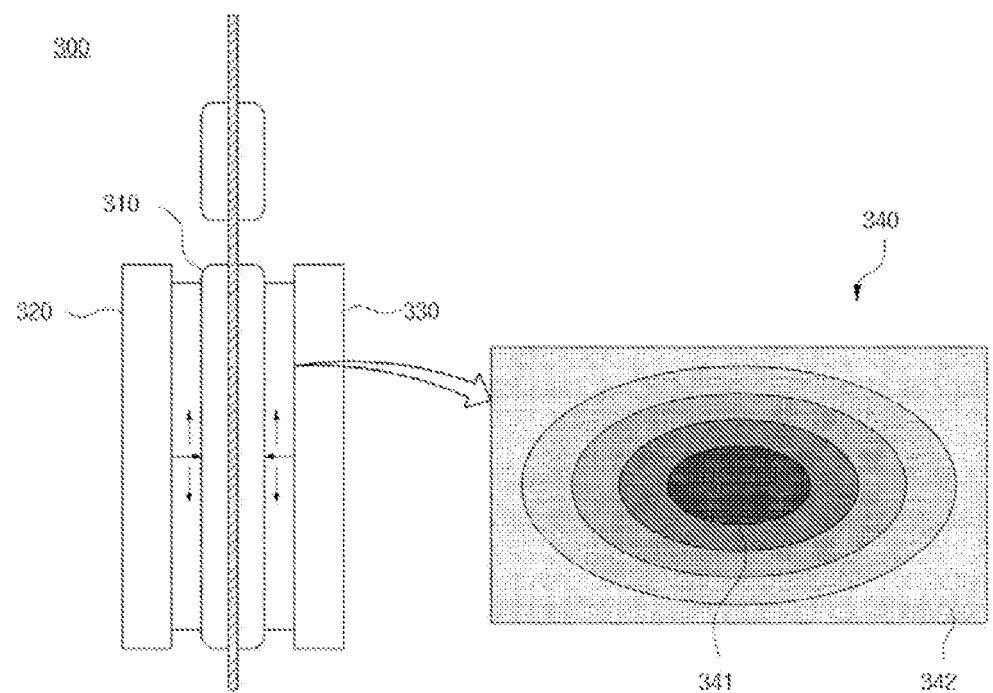

PRESSING JIG WITH A GRADIENT HARDNESS PRESSING PAD FOR A BATTERY CELL AND A DEGASSING METHOD OF BATTERY CELL USING THE SAME

TECHNICAL FIELD

This application claims the benefit of priority based on Korean Patent Application No. 10-2020-0138477, filed on Oct. 23, 2020, and the entire contents of the Korean patent application are incorporated herein by reference.

The present invention relates to a pressing jig of a battery cell including a pressing pad, and a method of degassing a battery cell using the same.

BACKGROUND ART

Recently, as electronic devices become small and light, a demand for small and light batteries is also on the increase. Hence, as small and light non-aqueous electrolyte secondary batteries such as lithium secondary batteries are commercialized, they are widely used in portable electronic devices such as small video cameras, mobile phones, and notebook computers.

In this regard, since lithium secondary batteries have a long lifespan and a large capacity, they are widely used in portable electronic devices. Examples of the lithium secondary batteries include lithium metal batteries which use liquid electrolyte, and lithium polymer batteries which use lithium ion batteries and polymer solid batteries. Further, lithium secondary batteries are divided into a prismatic battery, a cylindrical battery, and a pouch-type battery according to the type of the exterior material which is used to seal an electrode assembly.

Among them, the pouch-type battery cell has a high energy density per unit weight and volume and requires a low material cost. As such, in recent years, the development is actively in progress.

Such pouch-type battery cells are widely used in lithium polymer secondary batteries, and the manufacturing method is as follows.

First, a positive electrode plate and a negative electrode plate are manufactured, and a separator is interposed therebetween, which are then laminated, to thereby manufacture an electrode assembly. A plasticizer (DBP) is extracted in the manufactured electrode assembly, and a tap is welded to the lead of the electrode assembly to thereby be embedded in the pouch.

After embedding the electrode assembly in a pouch, an electrolyte solution is injected into the pouch, thereby allowing the electrolyte solution to be impregnated in the electrode assembly. The electrolyte solution is injected like the above, and the edge of the pouch is bonded by heat fusion, thereby sealing the pouch.

Likewise, in order to stabilize the assembly-completed pouch-type battery cell, the formation process of the battery cell is performed after going through an aging process.

Further, gas may be generated in the pouch during the formation process, and when such gas is trapped in the pouch, a defect of the battery cell may be caused. Hence, a degassing process of removing gas generated in the battery cell should be performed in the formation process.

FIG. 1 is a diagram illustrating a pressing jig 10 used in the formation process of a conventional battery cell. Referring to FIG. 1, the pressing jig 10 includes first and second plates 12 and 13 which press two surfaces of the battery cell 11. As the first and second plates 12 and 13 press two surfaces of the battery cell 11, the gas inside the battery cell 11 is discharged to the outside of the battery cell 11 through a gas pocket unit.

However, since the first and second plates 12 and 13 had a flat plate shape, force was not evenly applied when pressing a battery cell 11, and accordingly, gas in the battery cell 11 was not easily discharged to the outside.

DISCLOSURE

Technical Problem

The present invention is believed to solve at least some of the above problems. For example, an aspect of the present invention provides a pressing jig of a battery cell capable of easily discharging gas inside a battery cell, and a method of degassing a battery cell using the same.

Technical Solution

The present invention provides a pressing jig of a battery cell including a pressing pad. In one example, a pressing jig according to the present invention includes: first and second plates configured to press opposite surfaces of a battery cell disposed therebetween; a pressing pad provided at at least one of a surface of the first plate or a second plate facing the battery cell. At this time, the pressing pad includes n regions located on a same plane, and the n regions satisfy a following condition 1:

$$M1 > M2. \quad \text{[Condition 1]}$$

Herein, M1 and M2 denote a modulus of a central region and a peripheral region in the n regions, respectively.

In another example, in the pressing jig of a battery cell according to the present invention, the first and second plates each have the pressing pad.

In a specific example, the pressing pad satisfies a following condition 2.

$$R1 > R2 \quad \text{[Condition 2]}$$

Herein, R1 and R2 denote a hardness of a central region and a peripheral region in the n regions, respectively.

Further, in the pressing jig of a battery cell according to the present invention, the pressing pad has a central region and a peripheral region which have the same thickness.

In one example, the pressing pad has a structure in which the modulus gradually decreases from the central region to the peripheral region.

In one example, the n regions are arranged to have an orientation parallel to each other.

In another example, the peripheral regions are radially arranged with respect to the central region.

In a specific example, the central region includes at least one selected from the group consisting of hard silicone, hard plastic and hard foam, and the peripheral region includes at least one selected from the group consisting of soft plastic and soft foam.

In further another example, each of the first and second plates has a heating member.

Further, the present invention relates to a method of degassing a battery cell using the pressing jig of the battery cell. In one example, the method includes degassing a battery cell by pressing the opposite surfaces of the battery cell using the pressing jig of the battery cell during a formation process of the battery cell.

At this time, the degassing may include applying heat to the first and second plates.

Advantageous Effects

According to a pressing jig of a battery cell including a pressing pad, and a method of degassing a battery cell using the same of the present invention, it is possible to manufacture a battery cell with stability by easily removing gas generated during the formation process of a battery cell.

BRIEF DESCRIPTION OF THE DRAWINGS

FIG. 1 is a schematic diagram showing a structure in which a battery cell laminate and a buffer pad are arranged in a conventional battery module.

FIG. 2 is a schematic diagram showing a pressing jig of a battery cell according to an example of the present invention.

FIG. 3 is a diagram schematically showing the process in which bubbles inside a battery cell are discharged when pressing the battery cell using a pressing jig of the battery cell according to one example of the present invention.

FIG. 4 is a schematic diagram showing a pressing jig of a battery cell according to another example of the present invention.

FIG. 5 is a schematic diagram showing a pressing jig of a battery cell according to further another example of the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention relates to a pressing jig of a battery cell including a pressing pad, and a method of degassing a battery cell using the same.

Generally, in order to stabilize the assembly-completed pouch-type battery cell in the method of manufacturing a battery cell, the formation process of the battery cell is performed after going through an aging process. However, gas may be generated in the pouch during the formation process, and when such gas is trapped in the battery cell, a defect of the battery cell may be caused. Hence, a degassing process of removing gas generated in the battery cell should be performed in the formation process. Conventionally, gas generated in the battery cell was discharged to the outside using a pressing jig which presses two surfaces of the battery cell. However, since a conventional pressing jig had a flat plate shape, force was not evenly applied when pressing a battery cell, and accordingly, gas in the battery cell was not easily discharged to the outside.

As such, the present invention provides a pressing jig of a battery cell including a pressing pad in which the modulus of the central region is different from the modulus of the peripheral region, and a method of degassing a battery cell using the same. The pressing pad can easily discharge gas in the battery cell during the formation process of a battery cell by allowing higher pressure to be applied to the central region than the peripheral region. Particularly, in the formation process of the battery cell, the thickness of the battery cell increases due to the expansion of the negative electrode. At this time, gas generated in the battery cell may be easily discharged to the outside by allowing force to be transmitted from the central region to the peripheral region of the battery cell.

Hereinafter, a pressing jig of a battery cell including a pressing pad, and a method of degassing a battery cell using the same according to the present invention will be described in detail.

In one example, a pressing jig of a battery cell according to the present invention includes: first and second plates which have a battery cell therebetween and press two surfaces of the battery cell; a pressing pad which is included in at least one of the first and second plates and formed on a surface of the first and/or second plates contacting the battery cell.

At this time, the pressing pad includes n regions located on a same plane, and the n regions satisfy a following condition 1:

$$M1 > M2. \qquad \text{[Condition 1]}$$

Herein, the M1 and the M2 each denote a modulus of a central region and a peripheral region in the n regions. Further, the pressing pad satisfies a following condition 2.

$$R1 > R2 \qquad \text{[Condition 2]}$$

Herein, the R1 and the R2 each denotes a hardness of a central region and a peripheral region in the n regions.

In one example, the pressing jig of a battery cell according to the present invention is a device which presses the battery cell to discharge bubbles generated in the battery cell during the formation process of the battery cell. In a specific example, the pressing jig according to the present invention includes a pressing pad having different physical properties by regions, and the pressing pad can easily discharge gas in the battery cell during the formation process of a battery cell by allowing higher pressure to be applied to the central region than the peripheral region. Particularly, in the formation process of the battery cell, the thickness of the battery cell increases due to the expansion of the negative electrode. At this time, if there comes to be a difference between force applied to the central region of the battery cell and force applied to the peripheral region of the battery cell, gas generated in the battery cell may be easily discharged to the outside. Further, when the pressing jig according to the present invention presses the battery cell, the edge portion of the battery cell is pressed using less pressure, the amount of the electrolyte solution discharged may decrease.

In the present invention, first and second plates are a device which presses a battery cell with a predetermined pressure to discharge bubbles of the battery cell. The first and second plates may be made of an insulating material such as aluminum.

On the other hand, if the battery cell is a secondary battery capable of charging and discharging, it is not particularly limited.

In a specific example, the battery cell is a pouch type unit cell, and an electrode assembly having a positive electrode/separator/negative electrode structure is embedded in an exterior material of the laminate sheet in a state that is connected to electrode leads formed outside the exterior material. The electrode leads may be drawn to the outside of the sheet and may be extended in the same or opposite direction to each other.

Figures of the present invention show only a pouch-type battery cell having a form where a pair of electrode leads are withdrawn in the opposite direction for the convenience of explanation, but the battery cell, which is applied to the battery module according to the present invention, is not particularly limited thereto, and a pair of electrode leads may be withdrawn in the same direction. Further, the pouch-type battery cell may have a gas discharge path. For example, a battery cell may have a gas pocket unit.

In one example, the pressing jig of the battery cell according to the present invention includes first and second plates, and the first and second plates each include a pressing plate. As described above, in then regions of the pressing pad, the modulus and the hardness of the central region are higher than those of the peripheral region, and this means that the central region is made of a material which is not easily deformed.

In one example, the central region of the pressing pad may be made of a hard material and may include at least one selected from the group consisting of hard silicone, hard plastic and hard foam. In a specific example, it is possible to apply higher pressure to the central region of the battery cell than the peripheral region of the battery cell by using the central region made of a hard material. Further, in the pressing pad, the peripheral region may include at least one selected from the group consisting of soft plastic and soft foam. Specifically, the peripheral region may be made of a soft elastic material and may contain a material including a soft elastic material such as polyurethane foam (PU foam) or ethylene propylene diene monomer (EDPM).

In another example, the n regions of the pressing pad may be made of the same material, but the physical property may be different by regions. In a specific example, n regions of the pressing pad may be made of the same material, but the modulus and the hardness may be different by regions.

In one example, in the pressing pad, the thickness of the central region is the same as that of the peripheral region. Namely, the thickness of each of n regions of the pressing pad is the same. However, when pressing the battery cell, the thickness of each region may be different according to the physical property and pressing degree of each region.

In another example, the pressing pad includes n regions positioned on the same plane. Herein, then may be in the range of 2 to 100, 3 to 80, 4 to 60, 5 to 40, 6 to 20 or 7 to 10, but the present invention is not limited to these examples.

In a specific example, in the pressing pad, the n regions are arranged to have an orientation to each other. For example, when a pressing pad is divided into an upper region, a central region and a lower region, the central region corresponds to the center region of the pressing pad, and the upper and lower regions correspond to the peripheral regions of the pressing pad. Herein, the pressing pad has a structure in which a size of the modulus gradually decreases from the central region to the peripheral region. Further, the pressing pad may have a structure in which a size of the hardness gradually decreases from the central region to the peripheral region. This means that the shape of the pressing pad is more easily changed at the peripheral region than the central region of the pressing pad.

In another example, in the n regions, the peripheral regions are radially arranged with respect to the central region. For example, the pressing pad is divided into a core and a plurality of shells surrounding the core. Herein, the core corresponds to the central region, and the shells correspond to the peripheral region. Herein, the pressing pad has a structure in which a size of the modulus gradually decreases from the central region to the peripheral region. Further, the pressing pad may have a structure in which a size of the hardness gradually decreases from the central region to the peripheral region. This means that the shape of the pressing pad is more easily changed at the peripheral region than the central region of the pressing pad.

Namely the pressing pad is used to easily discharge gas in the battery cell during the formation process of a battery cell by allowing higher pressure to be applied to the central region than the peripheral region. Since the modulus and the hardness of the pressing pad have been described above, the detailed description of thereof will be omitted here.

Further, the size of the pressing jig is set to be greater than that of the battery cell so that force may be applied to the entire surface of the battery cell at a time. In a specific example, the first and second plates and the pressing pad may be formed to have an area greater than the area of the battery cell.

In further another example, the first and second plates may have a heating member. For example, the first and second plates may include a heat wire. This is used to effectively discharge gas inside the battery cell by additionally applying heat as well as pressure to the battery cell when pressing the battery cell.

The present invention provides a method for degassing a battery cell using the above-described pressing jig of a battery cell.

In one example, a method of degassing a battery cell according to the present invention includes degassing a battery cell by pressing two surfaces of the battery cell using the pressing jig of the battery cell during a formation process of the battery cell.

In a specific example, a battery cell having a gas discharge path at one side or both sides may discharge gas generated through the formation process. Herein, gas inside the battery cell may be discharged to the outside by pressing the battery cell using a pressing jig. Further, the degassing may include applying heat to the first and second plates.

The method of degassing a battery cell of the present invention is characterized in using the pressing jig of the battery cell. Particularly, the pressing jig according to the present invention includes a pressing pad having different physical properties by regions, and the pressing pad can easily discharge gas in the battery cell during the formation process of a battery cell by allowing higher pressure to be applied to the central region than the peripheral region. Further, when the pressing jig according to the present invention presses the battery cell, the edge portion of the battery cell is pressed using less pressure, the amount of the electrolyte solution discharged may decrease.

DETAILED DESCRIPTION OF THE PREFERRED EMBODIMENTS

Hereinafter, various forms of a pressing jig of a battery cell including a pressing pad according to the present invention will be described with reference to drawings.

First Embodiment

FIG. 2 is a schematic diagram showing a pressing jig of a battery cell according to an example of the present invention, and FIG. 3 is a diagram schematically showing the process in which bubbles inside a battery cell are discharged when pressing the battery cell using a pressing jig of the battery cell according to one example of the present invention.

Referring to FIGS. 2 and 3, a pressing jig 100 of a battery cell according to the present invention includes: first and second plates 120 and 130 which have a battery cell therebetween and press two surfaces of the battery cell 110; and a pressing pad 140 which is included in at least one of the first and second plates 120 and 130 and formed on a surface of the first and/or second plates contacting the battery cell 110. Specifically, the first and second plates 120 and 130 each include a pressing pad 140.

The pressing jig 100 of a battery cell according to the present invention is a device which presses the battery cell to discharge bubbles generated in the battery cell 110 during the formation process of the battery cell 110. Particularly, the pressing pad 140 of the pressing jig 100 according to the present invention can easily discharge gas in the battery cell 110 during the formation process of a battery cell 110 by allowing higher pressure to be applied to the central region than the peripheral region.

Specifically, the pressing pad 140 includes n regions located on the same plane. Further, the n regions satisfy a following condition 1:

$$M1 > M2 \quad \text{[Condition 1]}$$

Herein, the M1 and the M2 each denote a modulus of a central region and a peripheral region in the n regions. In the drawing, the pressing pad includes 3 regions, but the present invention is not limited to this example.

Further, the pressing pad satisfies a following condition 2.

$$R1 > R2 \quad \text{[Condition 2]}$$

Herein, the R1 and the R2 each denotes a hardness of a central region and a peripheral region in the n regions.

In the n regions of the pressing pad 140, the modulus/the hardness of the central region 141 are higher than those of the peripheral region 142, and this means that the central region is made of a material which is not easily deformed.

The pressing pad 140 according to the present invention is designed to apply higher pressure to the central region 141 than the peripheral region 142. Further, when the pressing jig 100 according to the present invention presses the battery cell 110, the edge portion of the battery cell 110 is pressed using less pressure, the amount of the electrolyte solution discharged may decrease.

Second Embodiment

FIG. 4 is a schematic diagram showing a pressing jig of a battery cell according to another example of the present invention.

Referring to FIG. 4, a pressing jig 200 of a battery cell according to the present invention includes: first and second plates 220 and 230 which have a battery cell therebetween and press two surfaces of the battery cell 210; and a pressing pad 240 which is included in at least one of the first and second plates 220 and 230 and formed on a surface of the first and/or second plates contacting the battery cell 210.

At this time, the pressing pad 240 includes n regions located on the same plane. Referring to FIG. 4, the pressing pad 240 includes 9 regions, but the present invention is not limited to this example.

Specifically, in the pressing pad 240, the n regions are arranged to have an orientation to each other. Namely, the pressing pad 240 is divided into an upper region, a central region and a lower region. The central region corresponds to the center region of the pressing pad 240, and the upper and lower regions correspond to the peripheral regions of the pressing pad 240.

Herein, the pressing pad 240 has a structure in which a size of the modulus gradually decreases from the central region to the peripheral region. Further, the pressing pad 240 may have a structure in which a size of the hardness gradually decreases from the central region to the peripheral region. This means that the shape of the pressing pad 240 is more easily changed at the peripheral region than the central region of the pressing pad.

Namely the pressing pad 240 is used to easily discharge gas in the battery cell 210 during the formation process of a battery cell 210 by allowing higher pressure to be applied to the central region than the peripheral region. Since the modulus and the hardness of the pressing pad 240 have been described above, the detailed description of thereof will be omitted here.

Third Embodiment

FIG. 5 is a schematic diagram showing a pressing jig of a battery cell according to further another example of the present invention.

Referring to FIG. 5, a pressing jig 300 of a battery cell according to the present invention includes: first and second plates 320 and 330 which have a battery cell therebetween and press two surfaces of the battery cell 310; and a pressing pad 340 which is included in at least one of the first and second plates 320 and 330 and formed on a surface of the first and/or second plates contacting the battery cell 310.

At this time, the pressing pad 340 includes n regions located on the same plane. In the drawing, the pressing pad 240 includes 5 regions, but the present invention is not limited to this example.

Specifically, in the pressing pad 340, the n regions have a structure where peripheral regions are radially arranged with respect to the central region. Namely, the pressing pad 340 is divided into a core and a plurality of shells surrounding the core. Herein, the core corresponds to the central region, and the shells correspond to the peripheral region.

Herein, the pressing pad 340 has a structure in which a size of the modulus gradually decreases from the central region to the peripheral region. Further, the pressing pad 340 may have a structure in which a size of the hardness gradually decreases from the central region to the peripheral region. This means that the shape of the pressing pad 340 is more easily changed at the peripheral region than the central region of the pressing pad 340.

Namely the pressing pad 340 is used to easily discharge gas in the battery cell 310 during the formation process of a battery cell 310 by allowing higher pressure to be applied to the central region than the peripheral region. Since the modulus and the hardness of the pressing pad 340 have been described above, the detailed description of thereof will be omitted here.

Fourth Embodiment

The present invention provides a method for degassing a battery cell using the above-described pressing jig of a battery cell.

A method of degassing a battery cell according to the present invention includes degassing a battery cell by pressing two surfaces of the battery cell using the pressing jig of the battery cell during a formation process of the battery cell.

Specifically, a battery cell having a gas discharge path at one side or both sides may discharge gas generated through the formation process. Herein, gas inside the battery cell may be discharged to the outside by pressing the battery cell using a pressing jig.

Although preferred examples of the present invention have been described with reference to drawings, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF REFERENCE NUMERALS 10, 100, 200, 300: pressing jig
11, 110, 210, 310: battery cell
12, 120, 220, 320: first plate
13, 130, 230, 330: second plate
140, 240, 340: pressing pad
141, 241, 341: central region
142, 242, 342: peripheral region

The invention claimed is:

1. A pressing jig of a battery cell, the pressing jig comprising:
   first and second plates configured to press opposite surfaces of a battery cell disposed therebetween and
   a pressing pad provided at at least one of a surface of the first plate or a surface of the second plate facing the battery cell,
   wherein the pressing pad includes n regions located on a same plane,
   wherein the n regions satisfy a following condition 1:

$$M1 > M2, \qquad \text{[Condition 1]}$$

where M1 and M2 denote a modulus of elasticity of a central region and a peripheral region in the n regions, respectively,
   wherein the central region and the peripheral region have a same thickness while being spaced apart from the battery cell or the central region and the peripheral region are different materials.

2. The pressing jig of claim 1, wherein the first and second plates each have the pressing pad.

3. The pressing jig of claim 1, wherein the pressing pad satisfies a following condition 2:

$$R1 > R2, \qquad \text{[Condition 2]}$$

where R1 and R2 denote a hardness of a central region and a peripheral region in the n regions, respectively.

4. The pressing jig of claim 1, wherein the pressing pad has a structure in which the modulus of elasticity gradually decreases from the central region to the peripheral region.

5. The pressing jig of claim 1, wherein, in the pressing pad, the n regions are arranged to have an orientation parallel to each other.

6. The pressing jig of claim 1, wherein, in the n regions, the peripheral regions are arranged radially with respect to the central region.

7. The pressing jig of claim 1, wherein the central region includes at least one selected from the group consisting of silicone, plastic and foam.

8. The pressing jig of claim 1, wherein the peripheral region includes at least one selected from the group consisting of plastic and foam.

9. The pressing jig of claim 1, wherein each of the first and second plates has a heating member.

10. A method of degassing a battery cell, the method comprising degassing a battery cell by pressing the opposite surfaces of the battery cell using the pressing jig of claim 1 during a formation process of the battery cell.

11. The method of claim 9, wherein the degassing includes applying heat to the first and second plates.

* * * * *